(12) United States Patent
Park et al.

(10) Patent No.: US 9,303,193 B2
(45) Date of Patent: Apr. 5, 2016

(54) WATERPROOF TAPE FOR PREVENTING LEAKAGE OF LIGHT

(71) Applicant: GUARDNEC CO., LTD., Yongin-si, Gyeonggi-do (KR)

(72) Inventors: Ki-Ho Park, Yeoju-si (KR); Won-Seok Choi, Osan-si (KR)

(73) Assignee: GUARDNEC CO., LTD., Gyeonggi-do (KR)

( * ) Notice: Subject to any disclaimer, the term of this patent is extended or adjusted under 35 U.S.C. 154(b) by 0 days.

(21) Appl. No.: 14/465,914

(22) Filed: Aug. 22, 2014

(65) Prior Publication Data

US 2015/0315423 A1    Nov. 5, 2015

(30) Foreign Application Priority Data

May 2, 2014    (KR) .................. 10-2014-0053209

(51) Int. Cl.
| | | |
|---|---|---|
| *B32B 3/10* | (2006.01) | |
| *C08K 3/04* | (2006.01) | |
| *C09J 7/02* | (2006.01) | |
| *B32B 27/40* | (2006.01) | |
| *C08K 3/22* | (2006.01) | |
| *C08K 3/00* | (2006.01) | |

(52) U.S. Cl.
CPC .............. *C09J 7/0296* (2013.01); *B32B 3/10* (2013.01); *B32B 27/40* (2013.01); *C08K 3/0033* (2013.01); *C08K 3/04* (2013.01); *C08K 3/22* (2013.01); *C09J 7/0282* (2013.01); *B32B 2274/00* (2013.01); *B32B 2305/026* (2013.01); *B32B 2307/73* (2013.01); *C08K 2003/2227* (2013.01); *C09J 2475/006* (2013.01); *Y10T 428/24802* (2015.01); *Y10T 428/24851* (2015.01); *Y10T 428/249953* (2015.04); *Y10T 428/249983* (2015.04); *Y10T 428/26* (2015.01); *Y10T 428/2835* (2015.01); *Y10T 428/31551* (2015.04)

(58) Field of Classification Search
CPC ...................................................... B32B 27/40
See application file for complete search history.

(56) References Cited

U.S. PATENT DOCUMENTS

2010/0143685 A1\*    6/2010    Nakayama et al. .......... 428/220

FOREIGN PATENT DOCUMENTS

| CN | 203451428 U | \* | 2/2014 |
| EP | 612821 A1 | \* | 8/1994 |

OTHER PUBLICATIONS

DERWENT English-language abstract of CN 203451428.\*

\* cited by examiner

*Primary Examiner* — Ian Rummel
(74) *Attorney, Agent, or Firm* — Davis & Bujold PLLC; Michael J. Bujold

(57) ABSTRACT

There is provided a waterproof tape for preventing leakage of light including: a waterproof film that contains extruded or cast thermoplastic polyurethane (TPU); and a light-blocking film that is laminated on the waterproof film and contains a colored substance.

7 Claims, 3 Drawing Sheets

WATERPROOF TAPE FOR PREVENTING LEAKAGE OF LIGHT

CROSS-REFERENCE TO RELATED APPLICATIONS

This application claims priority to Korean Patent Application No. 2014-0053209, filed on May 2, 2014, which is herein incorporated by reference in its entirety.

BACKGROUND OF THE INVENTION

1. Field of the Invention

The present invention relates to a waterproof tape for preventing leakage of light.

2. Description of the Related Art

In recent years, along with the trend toward high quality of mobile terminals such as smart phones, functions of the mobile terminals are getting diversified. Recently, customers have showed rapidly increasing interest in and demand for a water proof function among various functions of the mobile terminals.

In order to realize a waterproof function of a mobile terminal, micro interstices at a terminal module and a junction in the mobile terminal need to be sealed. However, in most of current mobile terminals, the components of each mobile terminal are bonded to each other with an adhesive or an adhesive tape. Thus, micro interstices thereof have not been sufficiently sealed. Therefore, if a mobile terminal falls into water or is immersed in water for a relatively long periods of time, the water penetrates the above-described adhesive tape and permeates into the mobile terminal through the micro interstices.

Further, such an adhesive tape may be attached to a window panel of the mobile terminal. In this case, light emitted from a display panel leaks out through the adhesive tape, resulting in a light leakage phenomenon. Such light leakage phenomena account for a substantial proportion of customer complaints and thus need to be solved for high quality of mobile terminals.

SUMMARY OF THE INVENTION

An object of the present invention provides a waterproof tape for preventing leakage of light that can provide a waterproof function to a target object and also prevent leakage of light from the target object.

According to an aspect of the present invention, there is provided a waterproof tape for preventing leakage of light including: a waterproof film that contains extruded or cast thermoplastic polyurethane (TPU); and a light-blocking film that is laminated on the waterproof film and contains a colored substance.

Herein, the light-blocking film may include: a substrate; and a printing layer that is printed on the substrate and contains the colored substance.

Herein, the printing layer may be arranged between the waterproof film and the substrate.

Herein, the colored substance may include carbon black.

Herein, the printing layer may include: a first printing layer that is printed on the substrate; and a second printing layer that is printed on the first printing layer.

Herein, the light-blocking film may have a thickness of 1 μm to 20 μm.

Herein, the waterproof tape for preventing leakage of light may further include: an attachment layer that is laminated on the light-blocking film and contains a cohesive or adhesive polymer resin.

According to another aspect of the present invention, there is provided a waterproof tape for preventing leakage of light including: a light-blocking waterproof film that is prepared by extruding or casting a mixture of thermoplastic polyurethane and a color pigment.

Herein, the color pigment may include carbon black and an organic solvent.

Herein, the carbon black may be mixed in a content of 100 parts by weight or more with respect to 100 parts by weight of the organic solvent.

Herein, the mixture may include aluminum oxide ($Al_2O_3$).

Herein, the waterproof tape for preventing leakage of light may further include: an attachment layer that is laminated on the waterproof film and contains at least one of adhesive or cohesive polymer resin among an acryl-based resin, a rubber-based resin, and an epoxy-based resin.

According to yet another aspect of the present invention, there is provided a waterproof tape for preventing leakage of light including: a waterproof film containing a polymer that has a porosity of 1% to 50%; and a light-blocking film that is laminated on the waterproof film and contains a colored substance.

Herein, the polymer may include thermoplastic polyurethane or polyethylene terephthalate (PET).

According to still another aspect of the present invention, there is provided a waterproof tape for preventing leakage of light including: a light-blocking waterproof film that contains a polymer and a color pigment, and has a porosity of 1% to 50%; and an attachment layer that is laminated on the waterproof film and contains a cohesive or adhesive polymer resin.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
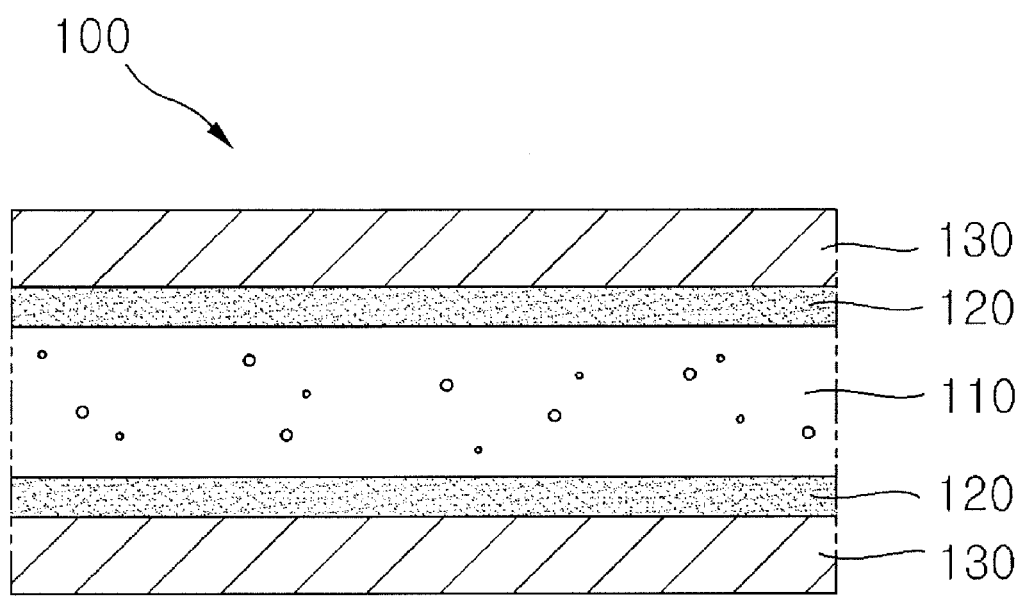
FIG. 1 is a cross-sectional view of a waterproof tape 100 for preventing leakage of light according to an exemplary embodiment of the present invention.

Exemplary embodiments of a waterproof tape for preventing leakage of light according to the present invention will now be described in detail with reference to the accompanying drawings. In the present specification, like or similar components in different exemplary embodiments will be assigned like or similar reference numerals, and corresponding descriptions will be omitted.

FIG. 1 is a cross-sectional view of a waterproof tape 100 for preventing leakage of light according to an exemplary embodiment of the present invention.

Referring to FIG. 1, the waterproof tape 100 for preventing leakage of light may include a waterproof film 110, a light-blocking film 120, and an attachment layer 130.

The waterproof film 110 is configured to provide a waterproof function to a place where the waterproof tape 100 for preventing leakage of light is attached.

The waterproof film 110 may be formed of thermoplastic polyurethane (TPU). The thermoplastic polyurethane is excellent in chemical resistance and resistance to abrasion caused by friction and also excellent in elasticity and flexibility, and, thus, it readily returns to its original shape when a pressure applied thereto is canceled.

The thermoplastic polyurethane of the waterproof film 110 may be formed by extrusion or casting. Herein, casting is a kind of film molding method, and by this method, the waterproof film 110 can be obtained by allowing molten thermoplastic polyurethane to flow on a substrate having a uniform surface and to be solidified at normal pressure.

The thermoplastic polyurethane formed as such may have a porosity of 1% to 50%. To be specific, pores may provide a buffer function to the thermoplastic polyurethane, but if too many pores are formed in the waterproof film 110, water may infiltrate into the waterproof film 110 through these pores. Therefore, in order to provide a waterproof function, preferably, the waterproof film 110 has a low porosity of 50% or less.

Further, the waterproof film 110 may have a thickness of 10 μm to 200 μm. To be specific, if a thickness of the waterproof film 110 is less than 10 μm, a waterproof property may deteriorate due to the above-described pores, and if a thickness of the waterproof film 110 is more than 200 μm the total thickness of the waterproof tape 100 for preventing leakage of light is increased, which may hinder slimness of a finished product to which the waterproof tape 100 is attached.

The waterproof film 110 may be formed of other polymers, such as polyethylene terephthalate (PET), than the above-described thermoplastic polyurethane. The polyethylene terephthalate has an excellent waterproof property due to the characteristics of the material. The waterproof film 110 formed of the polyethylene terephthalate may have the same porosity and thickness as the thermoplastic polyurethane, and can be formed by the same molding method.

The light-blocking film 120 is configured to provide a light leakage preventing function. The light-blocking film 120 may include a substrate and a printing layer.

The substrate is a base to which the printing layer is printed, and also maintains a shape of the waterproof film 110. The substrate may be formed into a polyethylene terephthalate (PET) film.

The printing layer is configured to block light. The printing layer can be formed through micro gravure printing of a colored substance in the form of ink on the substrate. The colored substance may include carbon black and an organic solvent.

Carbon black is black fine powder formed of carbon and has an excellent light-blocking property. Thus, when carbon black is attached to transparent thermoplastic polyurethane, it is possible to provide a light leakage preventing function to the waterproof tape 100.

A mixture of the organic solvent with the carbon black may form carbon ink as a colored substance. Herein, the carbon black may be mixed in a content of 100 parts by weight or more with respect to 100 parts by weight of the organic solvent. To be specific, as a content of the carbon black with respect to the total weight of the carbon ink increases, a light-blocking property also increases. When a content of the carbon black is 50% or more, a very high light-blocking property can be obtained.

Figure 2:
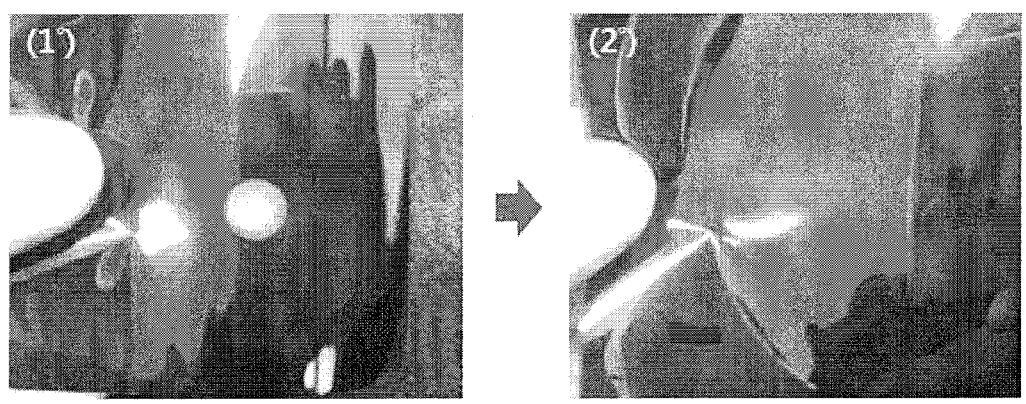
FIG. 2 provides photos for comparing a light-blocking property of the waterproof tape 100 for preventing leakage of light of FIG. 1 depending on the number of printings of a printing layer.

The carbon ink formed as such may be printed multiple times on the substrate formed into the PET film, thereby forming a printing layer. Herein, since the carbon ink is printed by a micro gravure printing process involving a hot-air drying process, multiple printing layers can be rapidly formed on the substrate. To be specific, the light-blocking film 120 may be formed by forming a first printing layer through micro gravure printing of the carbon ink on the substrate and then forming a second printing layer through micro gravure printing of the carbon ink on the first printing layer. Herein, if a printing process is performed to the substrate only once, as illustrated on the left of FIG. 2, it is not easy to prevent a light leakage phenomenon and the printing layer may peel off. Therefore, the printing layer is formed through printing on the PET film multiple times, and, thus, it is possible to effectively prevent a light leakage phenomenon and a peeling-off phenomenon. Herein, the printing layer may further include a third or further printing layer in addition to the first printing layer and the second printing layer.

If the printing layer is printed on the substrate as such, the printing layer may be attached to the waterproof film 110 with a cohesive or adhesive. With this configuration, the printing layer that is relatively easy to peel off is arranged on the side of waterproof film 110 rather than the side of attachment layer 130, and, thus, the possibility of peeling off the printing layer can be reduced.

The light-blocking film 120 formed as such may have a thickness of 1 μm to 20 μm. Herein, if a thickness of the light-blocking film 120 is less than 1 □μm, a light-blocking efficiency decreases, and if a thickness of the light-blocking film 120 is more than 20 μm, the possibility of peeling off the light-blocking film 120 from the waterproof film 110 is relatively high. Therefore, since the light-blocking film 120 is formed to the above-described thickness, an excellent light-blocking property can be obtained together with excellent attaching force.

The attachment layer 130 is configured to provide attaching force of the waterproof tape 100 with respect to a target object. The attachment layer 130 may be formed of a cohesive or adhesive polymer resin. To be specific, the polymer resin may include at least one of an acryl-based resin, a rubber-based resin, and an epoxy-based resin.

Further, the attachment layer 130 may have a thickness of 10 μm to 100 μm. Herein, if a thickness of the attachment layer 130 is less than 10 μm, its attaching force relatively deteriorates, and if a thickness of the attachment layer 130 is more than 100 μm, a peeling-off phenomenon of the light-blocking film 120 may occur. Thus, a thickness of the attachment layer 130 can be regulated in the above-described range in consideration of the above-described problem and slimness of the target object.

The waterproof tape 100 for preventing leakage of light formed as described above can provide an excellent waterproof function to the target object, and also prevent leakage of light when it is attached to a front panel of a mobile terminal. Further, depending on a porosity of the waterproof film 110, it is also possible to obtain a shock-absorbing effect at a certain level with respect to the target object.

Figure 3:
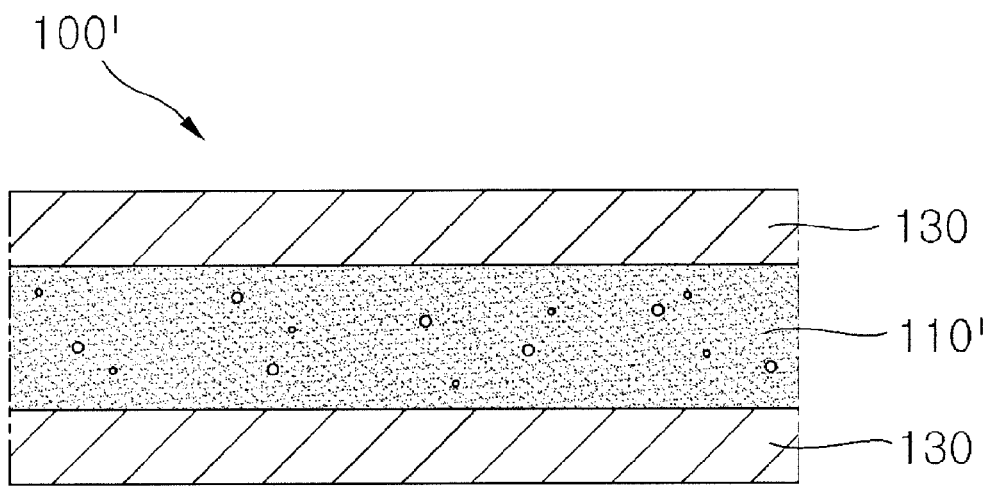
FIG. 3 is a cross-sectional view of a waterproof tape 100' for preventing leakage of light according to another exemplary embodiment of the present invention.

FIG. 3 is a cross-sectional view of a waterproof tape 100' for preventing leakage of light according to another exemplary embodiment of the present invention.

Referring to FIG. 3, the waterproof tape 100' for preventing leakage may include a waterproof film 110' formed in a different manner than the above-described exemplary embodiment.

The waterproof film 110' may further contain a color pigment and an inorganic substance in addition to thermoplastic polyurethane or polyethylene terephthalate.

Figure 4:
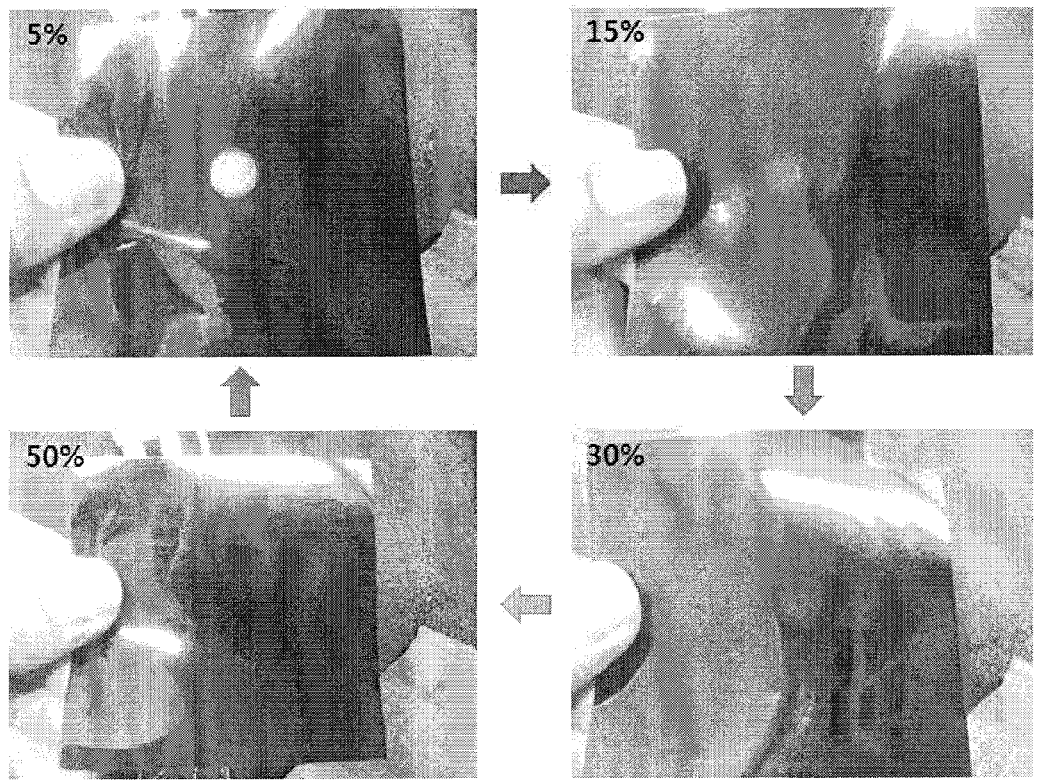
FIG. 4 provides photos for comparing a light-blocking property of the waterproof tape 100' for preventing leakage of light of FIG. 3 depending on a content of carbon black with respect to a color pigment.

The color pigment may include carbon black and an organic solvent like the above-described colored substance. Herein, the carbon black may be mixed in a content of 100 parts by weight or more with respect to 100 parts by weight of the organic solvent, as described above. Herein, as a content of the carbon black increases, a light-blocking property also increases, as described above. To be specific, referring to FIG. 4, when a content of the carbon black is 50% or more, a very high light-blocking property can be obtained.

The inorganic substance is configured to maintain a shape of the waterproof film 110'. Thermoplastic polyurethane has an excellent flexibility or elasticity due to the characteristics of the material, and, thus, it is not easy to maintain a shape. Therefore, an inorganic substance, such as aluminum oxide ($Al_2O_3$), having a high hardness is added to the waterproof film 110' so as to maintain a shape of the waterproof film 110'.

The waterproof film 110' can be obtained by preparing a mixture of the above-described elements through extrusion or casting.

According to the waterproof tape 100' formed as described above, the waterproof film 110' has a light-blocking property, and, thus, the light-blocking film 120 may be removed unlike the above-described exemplary embodiment. Thus, a process of printing carbon ink on a PET film and a process of attaching the light-blocking film 120 to the waterproof film 110' may be omitted, thereby reducing cumbersome processes in manufacturing.

Figure 5:
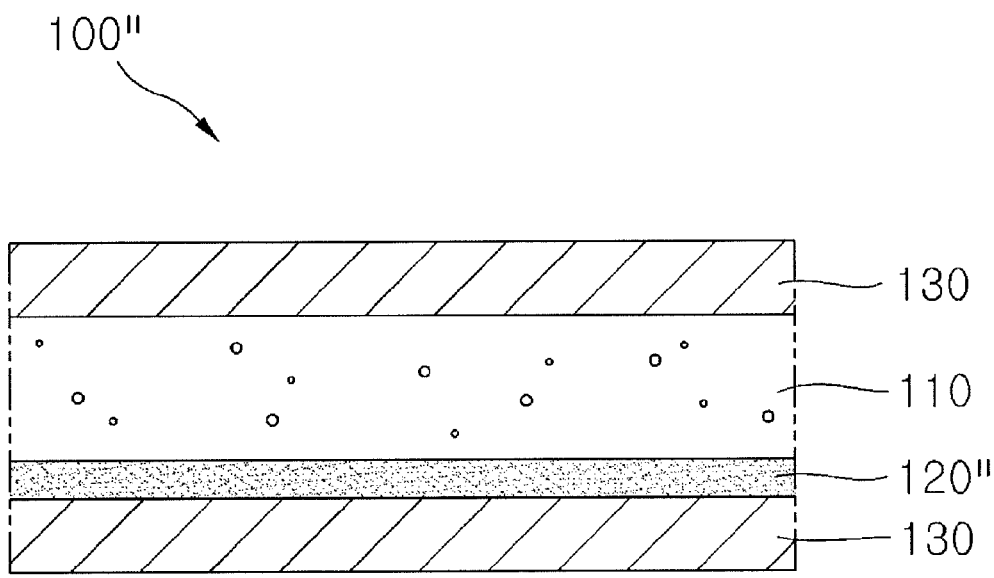
FIG. 5 is a cross-sectional view of a waterproof tape 100" for preventing leakage of light according to yet another exemplary embodiment of the present invention.

FIG. 5 is a cross-sectional view of a waterproof tape 100" for preventing leakage of light according to yet another exemplary embodiment of the present invention.

Referring to FIG. 5, the waterproof tape 100" for preventing leakage of light may include a single light-blocking film 120" unlike the above-described exemplary embodiment with reference to FIG. 1. With this configuration, if a light-blocking property at a slightly low level is required for a target place, the light-blocking film 120" is formed on only one of both surfaces of the waterproof film 110, thereby obtaining convenience in manufacturing and reducing manufacturing costs. Further, the waterproof tape 100" for preventing leakage of light may include only one attachment layer 130 depending on the characteristics of the target object.

According to the waterproof tape for preventing leakage of light formed as described above, the waterproof film formed of thermoplastic polyurethane or a polymer such as polyethylene terephthalate provides a waterproof function to a target object such as a mobile terminal.

Further, even if the waterproof tape for preventing leakage of light is attached to a window panel of a mobile terminal, the light-blocking film formed and attached to the waterproof film or the color pigment mixed in the waterproof film can easily block light leaking from a display panel of the mobile terminal, and, thus, can be further improved.

The waterproof tape for preventing leakage of light is not limited to the configurations and methods of the exemplary embodiments described above. The above-described exemplary embodiments may be selectively combined in whole or in part to achieve various modifications thereof.

While the present invention has been illustrated and described in connection with the exemplary embodiments, it will be apparent to those skilled in the art that modifications and variations can be made without departing from the spirit and scope of the invention as defined by the appended claims.

What is claimed is:

1. A waterproof tape for preventing leakage of light and absorbing shock comprising:
    a waterproof film that contains extruded or cast thermoplastic polyurethane (TPU),
    wherein the thermoplastic polyurethane has a thickness of 10 μm to 200 μm, and the thermoplastic polyurethane is one of extruded and cast and has a porosity of 1% to 50% to facilitate the waterproof tape absorbing shock; and
    a light-blocking film that is laminated on the waterproof film and contains a colored substance,
    the light-blocking film includes:
        a substrate which is polyethylene terephthalate; and
        a printing layer that is printed on the substrate and contains the colored substance,
        the printing layer is arranged between the waterproof film and the substrate,
        the thermoplastic polyurethane and the polyethylene terephthalate are formed so as to have a same porosity and a same thickness, and
        the colored substance includes carbon black.

2. The waterproof tape for preventing leakage of light and absorbing shock of claim 1, further comprising:
    an attachment layer that is laminated on the light-blocking film and contains a cohesive or adhesive polymer resin.

3. A method of manufacturing a waterproof tape for preventing leakage of light and absorbing shock, the method comprising:
    forming a waterproof film by extruding or casting thermoplastic polyurethane such that the thermoplastic polyurethane (a) has pores formed therein, (b) has a porosity of 1% to 50% and (c) has a thickness of 10 μm to 200 μm so to facilitate the waterproof tape absorbing shock;
    forming the thermoplastic polyurethane to have a porosity and a thickness and forming the polyethylene terephthalate so as to a porosity and a thickness which is the same as the thermoplastic polyurethane,
    forming a composite printing layer by applying a colored substance on polyethylene terephthalate to form a first printing layer, and then forming a second printing layer by applying the colored substance on the first printing layer; and
    attaching the polyethylene terephthalate and the composite printing layer to the waterproof film such that the second printing layer contacts the waterproof film.

4. The method of claim 3, further comprising the step of forming the waterproof film by allowing molten thermoplastic polyurethane to flow on a substrate and solidify.

5. The method of claim 4, further comprising the step of using the colored substance which contains a carbon black content of at least 50%.

6. The waterproof tape for preventing leakage of light and absorbing shock of claim 3, wherein the waterproof film is formed by allowing molten thermoplastic polyurethane to flow on a substrate and solidify.

7. The waterproof tape for preventing leakage of light and absorbing shock of claim 6, wherein the colored substance contains a carbon black content of at least 50%.

* * * * *